United States Patent
Bonnineau et al.

(10) Patent No.: US 11,943,458 B2
(45) Date of Patent: Mar. 26, 2024

(54) METHODS FOR DECODING AND ENCODING AN IMAGE, ASSOCIATED DEVICES AND SIGNAL

(71) Applicant: FONDATION B-COM, Cesson-Sévigné (FR)

(72) Inventors: Charles Bonnineau, Rennes (FR); Wassim Hamidouche, Rennes (FR); Jean-Yves Aubie, Melesse (FR)

(73) Assignee: FONDATION B-COM, Cesson-Sevigné (FR)

( * ) Notice: Subject to any disclaimer, the term of this patent is extended or adjusted under 35 U.S.C. 154(b) by 0 days.

(21) Appl. No.: 17/848,665

(22) Filed: Jun. 24, 2022

(65) Prior Publication Data

US 2022/0417541 A1    Dec. 29, 2022

(30) Foreign Application Priority Data

Jun. 25, 2021 (FR) ...................................... 2106859

(51) Int. Cl.
*H04N 19/30* (2014.01)
*H04N 19/13* (2014.01)
(Continued)

(52) U.S. Cl.
CPC ............ *H04N 19/30* (2014.11); *H04N 19/13* (2014.11); *H04N 19/132* (2014.11); *H04N 19/186* (2014.11); *H04N 19/42* (2014.11)

(58) Field of Classification Search
CPC ...... H04N 19/30; H04N 19/13; H04N 19/132; H04N 19/186; H04N 19/42; H04N 19/59; H04N 19/33

(Continued)

(56) References Cited

U.S. PATENT DOCUMENTS

| 2001/0019630 A1* | 9/2001 | Johnson | ................. H04N 19/30 375/E7.193 |
| 2007/0016418 A1* | 1/2007 | Mehrotra | ............... H04N 19/13 375/E7.129 |

(Continued)

FOREIGN PATENT DOCUMENTS

| WO | WO-2020025510 A1 * | 2/2020 | ........... H04N 19/132 |
| WO | 2020/188273 A1 | 9/2020 | |

OTHER PUBLICATIONS

Koziarski, Two-Stage Resampling for Convolutional Neural Network Training, Apr. 17, 2021, AGH University of Science and Technology (Year: 2021).*

(Continued)

*Primary Examiner* — Marnie A Matt
(74) *Attorney, Agent, or Firm* — NIXON & VANDERHYE (57) ABSTRACT

The invention relates to a method for decoding an image based on a base layer ($C_{base}$) and enhancement information ($I_{am}$), said method comprising the following steps:
  decoding said base layer ($C_{base}$) in order to obtain at least one base component ($Y_{decbase}$, $U_{decbase}$, $V_{decbase}$),
  oversampling the at least one base component ($Y_{decbase}$, $U_{decbase}$, $V_{decbase}$) in order to obtain at least one oversampled component ($Y_{surech}$, $U_{surech}$, $V_{surech}$),
  decoding the enhancement information ($I_{am}$) by means of a part (B) at least of artificial neural network in order to obtain enhancement values ($V_{am}$),
  reconstructing the image based on the at least one oversampled component ($Y_{surech}$, $U_{surech}$, $V_{surech}$) and the enhancement values ($V_{am}$).

The invention also relates to associated encoding method, electronic decoding device, electronic encoding device and signal.

20 Claims, 7 Drawing Sheets

(51) Int. Cl.
    *H04N 19/132*     (2014.01)
    *H04N 19/186*     (2014.01)
    *H04N 19/42*     (2014.01)

(58) Field of Classification Search
    USPC .................................................. 375/243.02
    See application file for complete search history.

(56) References Cited

U.S. PATENT DOCUMENTS

| | | | | |
|---|---|---|---|---|
| 2018/0247184 | A1* | 8/2018 | Lannes | G06F 18/214 |
| 2019/0108618 | A1* | 4/2019 | Hwang | G06N 3/084 |
| 2020/0027247 | A1 | 1/2020 | Minnen et al. | |
| 2020/0311870 | A1 | 10/2020 | Jung et al. | |
| 2020/0389658 | A1* | 12/2020 | Kim | H04N 19/184 |
| 2021/0058582 | A1* | 2/2021 | Aubie | H04N 21/440263 |
| 2022/0159311 | A1* | 5/2022 | Meardi | H04N 19/42 |
| 2022/0400270 | A1* | 12/2022 | Meardi | H04N 19/91 |

OTHER PUBLICATIONS

Ma et al., "Video compression with low complexity CNN-based spatial resolution adaptation", International Society for Optics and Photonics; In Applications of Digital Image Processing XLIII, Aug. 2020, vol. 11510, p. 115100D, 7 total pages.

Maurer et al., "Overview of MPEG-5 Part 2—Low Complexity Enhancement Video Coding (LCEVC)", ITU Journal: ICT Discoveries, Jun. 8, 2020, vol. 3(1), 11 total pages.

Lee et al., "A Hybrid Layered Image Compressor with Deep-Learning Technique", IEEE, In 2020 IEEE 22nd International Workshop on Multimedia Signal Processing (MMSP), Sep. 2020, 6 total pages.

Tsai et al., "Learning Binary Residual Representations for Domain-specific Video Streaming", In Proceedings of the AAAI Conference on Artificial Intelligence, Apr. 2018, vol. 32, No. 1, 8 total pages.

Cheng et al., "Learned Image Compression with Discretized Gaussian Mixture Likelihoods and Attention Modules", In Proceedings of the IEEE/CVF Conference on Computer Vision and Pattern Recognition, 2020, pp. 7939-7948, 15 total pages.

Duchon, "Lanczos Filtering in One and Two Dimensions", Journal of Applied Meteorology and Climatology, Aug. 1979, vol. 18(8), pp. 1016-1022.

Lim et al., "Enhanced Deep Residual Networks for Single Image Super-Resolution", In Proceedings of the IEEE conference on computer vision and pattern recognition workshops, 2017, pp. 136-144, 9 total pages.

Bonnineau et al., "Versatile Video Coding and Super-Resolution for Efficient Delivery of 8K Video With 4K Backward-Compatibility", ICASSP 2020-2020 IEEE International Conference on Acoustics, Speech and Signal Processing (ICASSP), 2020, pp. 2048-2052, 5 total pages.

Ballé et al., "End-To-End Optimized Image Compression", Presented at Int'l. Conf. on Learning Representations, Toulon, France, Apr. 2017, 2016, pp. 1-27.

Meardi et al., "MPEG-5 part 2: Low Complexity Enhancement Video Coding (LCEVC): Overview and performance evaluation", Optical Engineering + Applications, 2020, 21 total pages.

Minnen et al., "Joint Autoregressive and Hierarchical Priors for Learned Image Compression", 32nd Conference on Neural information Processing Systems (NIPS 2018), Montreal, Canada, ArXiv, abs/1809.02736, 2018, 22 total pages.

Search Report in French Application No. 2106859, dated Feb. 23, 2022.

Bottou, "Large-Scale Machine Learning with Stochastic Gradient Descent", Proceedings of Compstat'2010, Springer, 2010, pp. 177-186.

* cited by examiner

METHODS FOR DECODING AND ENCODING AN IMAGE, ASSOCIATED DEVICES AND SIGNAL

This application claims priority to FR 2106859 filed Jun. 25, 2021, the entire contents of each of which are hereby incorporated by reference.

TECHNICAL FIELD OF THE INVENTION

The present invention relates to the technical field of audiovisual content decoding and encoding.

It more particularly relates to methods for decoding and encoding an image, as well as associated devices and signal.

STATE OF THE ART

In order to enhance the user experience quality, audiovisual contents are subject to constant enrichment. For example, mention can be made of Ultra High Definition (UHD 4K) content, High Dynamic Range (HDR) content, or also high frame rate video content. These contents contain large volumes of data, which a provider often has to compress before transmitting them to final users.

The spatial resolution adaptation technique consists in subsampling an audiovisual content before compressing it, then in rescaling the decompressed content and in using quality enhancement techniques such as super-resolution methods to reconstruct the initial audiovisual content.

However, the use of this technique leaves information and detail loss due to subsampling and quantification during the compression.

Therefore, the problem arises of enhancing the image quality during the use of the spatial adaptation technique.

It has been proposed in the article "A Hybrid Layered Image Compressor with Deep-Learning Technique", by Lee, W. C., Chang, C. P., Peng, W. H., & Hang, H. M., 2020 IEEE 22nd International Workshop on Multimedia Signal Processing (MMSP) (pp. 1-6) to compress image enhancement data by applying to an enhancement layer of the image an artificial neural network using spatial attention modules guided by a base layer of the image. However, the technique proposed in this article does not consider applying a spatial adaptation of the base layer and thus does not provide spatial scalability.

DISCLOSURE OF THE INVENTION

In this context, the present invention proposes a method for decoding an image based on one base layer and enhancement information, said method comprising the following steps:
- decoding said one base layer in order to obtain at least one base component,
- oversampling the at least one base component in order to obtain at least one oversampled component,
- decoding enhancement information by means of a part at least of artificial neural network in order to obtain enhancement values,
- reconstructing the image based on the at least one oversampled component and the enhancement values.

The image is thus reconstructed on the basis of the base layer (which could be used alone to reconstruct an image of lower quality) and of enhancement information the decoding of which by means of the artificial neural network is particularly efficient.

The base component is for example one of the color components of the image, for example in the YUV color-coding system or the RGB color-coding system.

Other advantageous and non-limiting features of the method according to the invention, taken individually or according to all the technically possible combinations, are the following:
- the image reconstruction step comprises applying the at least one oversampled component and the enhancement values to another part of artificial neural network;
- the image reconstruction step comprises at least one pixel-to-pixel sum between the at least one oversampled component and at least one sub-set of the enhancement values;
- the decoding method comprises a step of obtaining parameters representative of an entropic model, and decoding the enhancement information comprises:
  a first entropic decoding step using the parameter representative of the entropic model,
  a second decoding step by means of the part of artificial neural network;
- the parameters representative of the entropic model are obtained by means of an additional part of artificial neural network.

The invention also proposes a method for encoding an image based on at least one component of said image, the method comprising the following steps:
- obtaining at least one base component based on the at least one component of said image by means of an encoding process,
- oversampling the at least one base component in order to obtain at least one oversampled component,
- obtaining enhancement information by encoding by means of a part at least of artificial neural network and based on the at least one component of the image and the at least one oversampled component.

The at least one base component has for example a resolution lower than that of the at least one component of the image.

Preferentially, the step of obtaining the at least one base component comprises the following sub-steps:
- subsampling the at least one component of said image in order to obtain at least one intermediate component,
- coding the at least one intermediate component in order to obtain a base layer,
- decoding the base layer in order to obtain the at least one base component.

According to a possible embodiment, the part at least of artificial neural network receives, on the one hand, the at least one oversampled component and, on the other hand, the at least one component of the image.

According to a possible embodiment, the encoding method comprises, before the step of obtaining enhancement information, at least one pixel-to-pixel difference between the at least one component of the image and the at least one oversampled component. This pixel-to-pixel difference corresponds to a residue calculation between the at least one component of the image and the at least one oversampled component.

The invention also relates to a device for decoding an image based on a base layer and enhancement information, comprising:
- a first decoding unit adapted to obtain at least one base component by decoding the base layer,
- an oversampling unit adapted to obtain at least one oversampled component by oversampling the at least one base component, a second decoding unit adapted to obtain enhancement values by decoding the enhancement information by means of a part at least of artificial neural network, a reconstruction unit adapted to reconstruct said image based on the at least one oversampled component and the enhancement values.

According to a possible embodiment, the reconstruction unit is adapted to reconstruct said image by applying the at least one oversampled component and the enhancement values to another part of artificial neural network.

According to a possible embodiment, the reconstruction unit is adapted to reconstruct said image based on at least one pixel-to-pixel sum between the at least one oversampled component and at least one sub-set of the enhancement values.

The invention also relates to a device for encoding an image based on at least one component of the image, comprising:

a unit for obtaining at least one base component based on the at least one component of the image, an oversampling unit adapted to obtain at least one oversampled component by oversampling the at least one base component, an encoding unit adapted to obtain enhancement information by encoding by means of a part at least of artificial neural network, based on the at least one component of the image and the at least one oversampled component.

The obtaining unit may include:

a subsampling module adapted to subsample the at least one component of the image in order to obtain at least one intermediate component, an encoding module adapted to encode the at least one intermediate component in order to obtain a base layer, a decoding module adapted to decode said base layer in order to obtain said at least one base component.

The invention also relates to a signal representative of at least one component of an image, comprising a base layer and enhancement information, said enhancement information being obtained based on the at least one component of the image and at least one oversampled component.

DETAILED DESCRIPTION OF THE INVENTION

Figure 1:
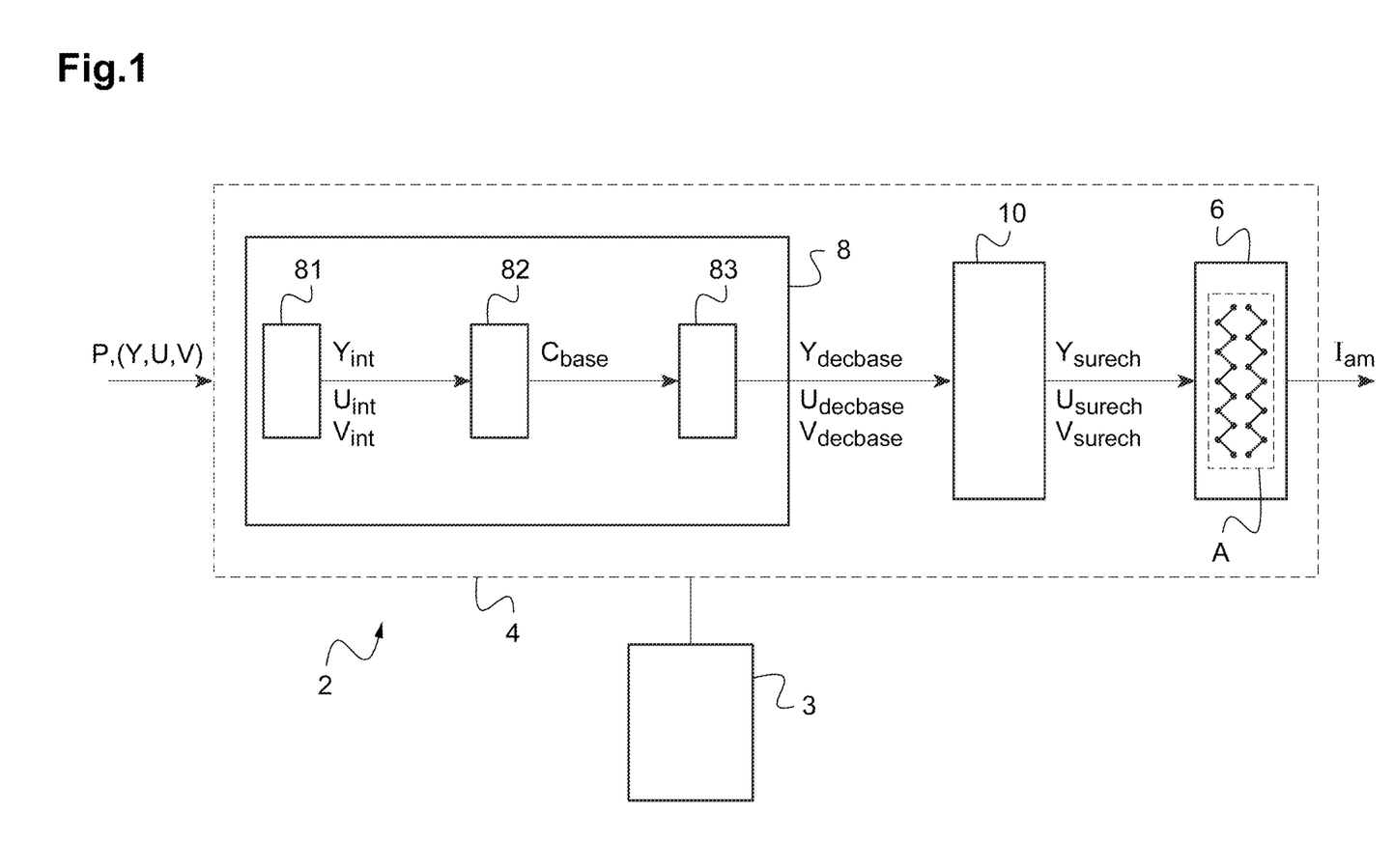
FIG. 1 shows an electronic encoding device used within the framework of the invention.

Moreover, various other features of the invention will be apparent from the appended description made with reference to the drawings that illustrate non-limiting embodiments of the invention, and wherein:

FIG. 1 shows an electronic encoding device 2 using a part A of artificial neural network.

The electronic encoding device 2 is configured to compress at least one component of an image. The image may be an image from a sequence of images to be compressed. Here, the electronic encoding device 2 is configured to compress three color components of the image, said components being defined in a given color-coding system. For example, the color-coding system may be the YUV coding system, or the RGB coding system, or also the XYZ coding system. In the following, it will be considered that the color-coding system to which the three color components of the image belong is the YUV coding system, but the invention could be applied to other color-coding systems, such as RGB or XYZ. There are in this case a luminance component Y, a first chrominance component U and/or a second chrominance component V.

The electronic encoding device 2 comprises an encoding unit 6, a unit 8 for obtaining three base components based on the components of the image, and an oversampling unit 10.

As schematically shown in FIG. 1, the encoding unit 6, the obtaining unit 8 and the oversampling unit 10 are here implemented by a processor 4 (for example, a microprocessor). As a alternative of using the processor 4, any other type of integrated circuit may be used, for example of the ASIC or FPGA type.

The electronic encoding device 2 also comprises a storage unit 3, for example a memory (possibly a rewritable non-volatile memory) or a hard-drive. Although the storage unit 3 is shown in FIG. 1 as a distinct element of processor 4, the storage unit 3 could as an alternative be integrated to (i.e. included in) the processor 4.

The processor 4 is in this case adapted to execute successively a plurality of instructions of a computer program stored for example in the storage unit 3.

The unit 8 for obtaining three base components ($Y_{decbase}$, $U_{decbase}$, $V_{decbase}$) based one the three components of the image comprises a subsampling module 81, an encoding module 82 and a decoding module 83.

As schematically shown in FIG. 1, the processor 4 of the electronic encoding device 2 receives data P and Binit representing at least one image I to be compressed. More precisely, data P are format data and data Binit are initial content data.

Format data P indicate characteristics of the format of representation of the image I, for example the size (in pixels) of the image I, the depth in bits of the luminance information and/or the depth in bits of the chrominance information, or in the case in which the image I is one image from a sequence of images, the frame rate.

Format data P further comprise information relating to a subsampling factor. This subsampling factor characterizes the subsampling made on the image I to be processed within the framework of application of a spatial resolution adaptation technique.

Content data Binit form a representation (here not compressed) of the components (Y, U, V) of the image I to be compressed. For example, the content data comprise, for each pixel of the component C of the image I to be compressed, data representing a luminance value of the pixel and/or data representing chrominance values of the pixel.

The subsampling module 81 is adapted to subsample data Binit using the information relating to the subsampling factor of format data P.

For example, the information relating to the subsampling factor may indicate a subsampling of all the color components of the image, in a given format such as YUV444 or YUV420, from 8K resolution to 4K resolution, or from 4K resolution to HD resolution.

In another possible example, the information relating to the subsampling factor may indicate that data Binit are in YUV444 format and must be subsampled to YUV420 format.

The subsampling module 81 thus produces, as a result of subsampling, three intermediate components ($Y_{int}$, $U_{int}$, $V_{int}$).

The encoding module 82 is adapted to receive three intermediate components ($Y_{int}$, $U_{int}$, $V_{int}$), from the subsampling module 81, and to encode the three intermediate components ($Y_{int}$, $U_{int}$, $V_{int}$). Any simple-layer encoding technique, such as the encoding according to VVC standard, may be used by the encoding module 82. After encoding, a base layer $C_{base}$ is obtained. The base layer contains compressed data representing the three intermediate components ($Y_{int}$, $U_{int}$, $V_{int}$).

The decoding module 83 is adapted to receive the base layer $C_{base}$, from the encoding module 82, and to decode the base layer $C_{base}$. Any simple-layer decoding technique, such as the decoding according to VVC standard, may be used. After decoding, three base components ($Y_{decbase}$, $U_{decbase}$, $V_{decbase}$) are obtained.

The oversampling unit 10 is adapted to receive the three base components ($Y_{decbase}$, $U_{decbase}$, $V_{decbase}$), from the decoding module 83, and to oversample the three base components ($Y_{decbase}$, $U_{decbase}$, $V_{decbase}$) using the information relating to the subsampling factor of format data P.

For example, if the information relating to the subsampling factor indicate a subsampling from 8K resolution to 4K resolution, the oversampling unit 10 oversamples from 4K resolution to 8K resolution. If the information relating to the subsampling factor indicate a subsampling from 4K resolution to HD resolution, the oversampling unit 10 oversamples from HD resolution to 4K resolution. If the information relating to the subsampling factor indicate a subsampling from YUV444 format to YUV420 format, the oversampling unit 10 oversamples from YUV420 format to YUV444 format. After oversampling, three oversampled components ($Y_{surech}$, $U_{surech}$, $V_{surech}$) are obtained. The three oversampled component ($Y_{surech}$, $U_{surech}$, $V_{surech}$) form oversampled content data Bsurech. Moreover, the three oversampled component ($Y_{surech}$, $U_{surech}$, $V_{surech}$) have the same resolution as the components (Y, U, V) of the image I to be compressed.

The oversampling operation may be carried out by the oversampling unit 10 using an oversampling algorithm, for example of the traditional type, or, as an alternative, based on a convolutive neural network. Reference will be made to the articles "*Lanczos filtering in one and two dimensions*" by Duchon, C. E. in Journal of Applied Meteorology and Climatology, 18(8) (1979), 1016-1022, and "*Enhanced deep residual networks for single image super-resolution*", by Lim, B. et al. in Proceedings of the IEEE conference on computer vision and pattern recognition workshops (2017) pp. 136-144, for an exemplary description of such algorithms. The encoding unit 6 is adapted to implement a part A of artificial neural network after having been configured by the processor 4.

As explained hereinafter, the part A of artificial neural network is used within the framework of a processing of the content data Binit and oversampled content data Bsurech aiming to obtain enhancement information $I_{am}$. This enhancement information $I_{am}$ is compressed data.

For example, the part A of artificial neural network is a part of a convolutional neural network comprising an alternation of convolution layers and normalization layers. Reference may be made to the article "*Joint Autoregressive and Hierarchical Priors for Learned Image Compression*", by Minnen et al. in NIPS'18: Proceedings of the 32nd International Conference on Neural Information Processing Systems, December 2018 p. 10794-10803, for a detailed description of this part of network.

The enhancement information $I_{am}$ is intended for a decoding device (for example, the decoding device 12 described hereinafter with reference to FIG. 2).

Figure 2:
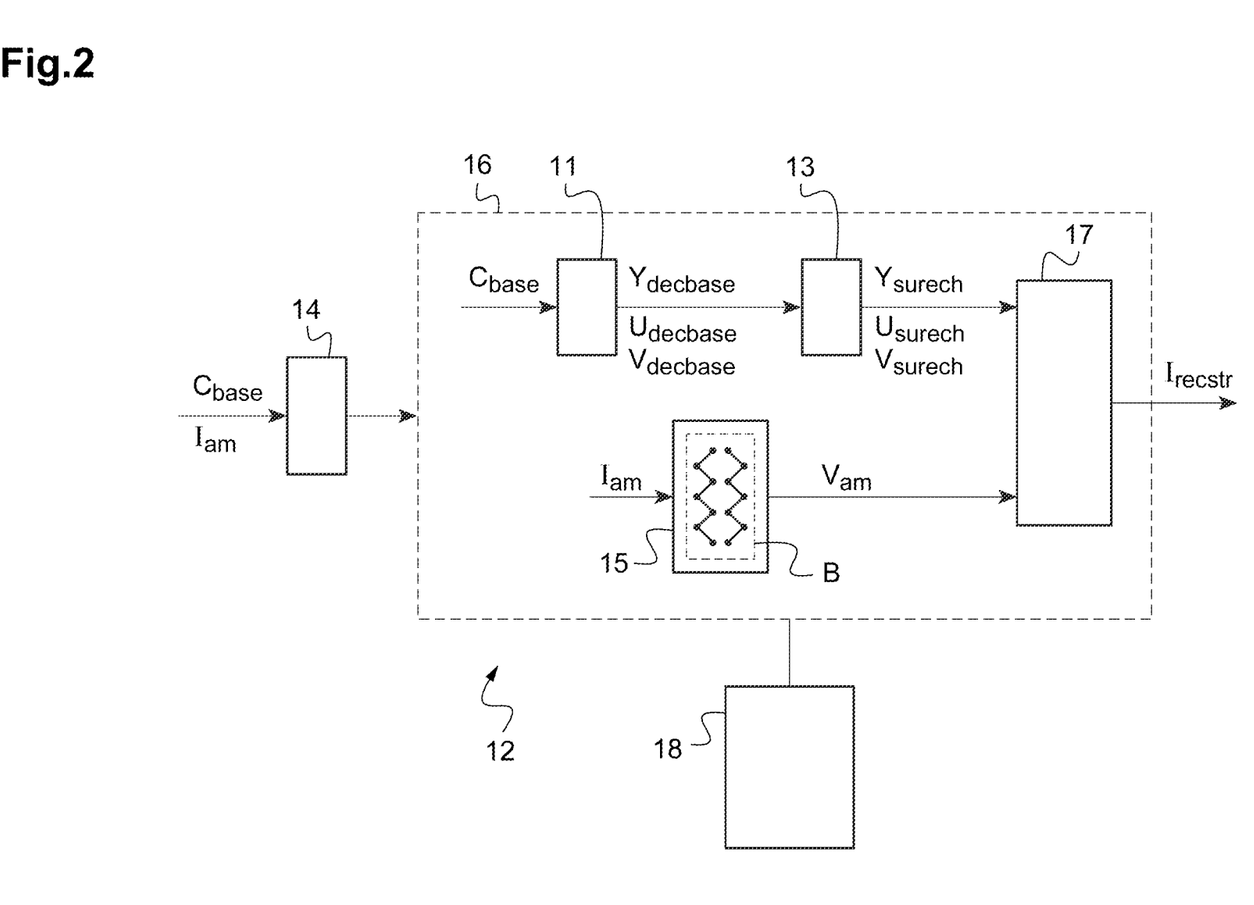
FIG. 2 shows an electronic decoding device used within the framework of the invention.

FIG. 2 shows an electronic decoding device 12 according to the invention and using a part B of artificial neural network. The part B of artificial neural network is for example a part of a convolutional neural network consisting in an alternation of convolution layers and normalization layers. Reference may be made to the article "*Joint Autoregressive and Hierarchical Priors for Learned Image Compression*", by Minnen et al. in NIPS'18: Proceedings of the 32nd International Conference on Neural Information Processing Systems, December 2018 p. 10794-10803, for a detailed description of this part of network.

This electronic decoding device 12 comprises a reception unit 14 and a processor 16 (for example, a microprocessor). As a alternative of the processor 16, any other type of integrated circuit may be used, for example of the ASIC or FPGA type.

The reception unit 14 is for example a communication circuit (such as a radiofrequency communication circuit) and makes it possible to receive data (and in particular here encoded data) from an external electronic device, such as the electronic encoding device 2, and to communicate these data to the processor 16 (to which the reception unit 14 is for example connected by a bus).

In the embodiment described herein, the data received by the reception unit 14 consist of a signal representative of three components of an image I, comprising on the one hand a base layer $C_{base}$, such as that obtained by the encoding module 82 of the electronic encoding device 2 described hereinabove, and on the other hand, enhancement information $I_{am}$, such as that obtained by the processing carried out by the above-described electronic encoding device 2. The data received by the reception unit 14 also include the above-described format data P, possibly reformatted so that they can be read by the electronic decoding device 12 according to the invention. The reception unit 14 communicates the base layer $C_{base}$ and format data P to the processor 16.

The electronic decoding device 12 also comprises a storage unit 18, for example a memory (possibly a rewritable non-volatile memory) or a hard-drive. Although the storage unit 18 is shown in FIG. 2 as a distinct element of the processor 16, the storage unit 18 could as an alternative be integrated to (i.e. included in) the processor 16.

The processor 16 is in this case adapted to execute successively a plurality of instructions of a computer program stored for example in the storage unit 18.

The electronic decoding device 12 further comprises a first decoding unit 11, an oversampling unit 13, a second decoding unit 15 and a reconstruction unit 17.

As schematically shown in FIG. 2, the first decoding unit 11, the oversampling unit 13, the second decoding unit 15 and the reconstruction unit are implemented by the processor 16. As indicated hereinabove, any type of integrated circuit other than the processor 16 may be used, for example of the ASIC or FPGA type.

The first decoding unit 11 is adapted to receive the base layer $C_{base}$ and to decode the base layer $C_{base}$ into three base components ($Y_{decbase}$, $U_{decbase}$, $V_{decbase}$). For example, the first decoding unit 11 may use a decoding module compatible with the VVC standard.

The oversampling unit 13 is adapted to receive, on the one hand from the first decoding unit 11, the three base components ($Y_{decbase}$, $U_{decbase}$, $V_{decbase}$), and on the other hand from the processor 16, the information relating to the subsampling factor of format data P, in order to oversample the three base components ($Y_{decbase}$, $U_{decbase}$, $V_{decbase}$). The oversampling unit 13 is adapted to produce, due to the oversample, three oversampled components ($Y_{surech}$, $U_{surech}$, $V_{surech}$).

The second encoding unit 15 is adapted to implement part B of artificial neural network after having been configured by the processor 16.

The second decoding unit 15 is in particular adapted to receive from the processor the enhancement information $I_{am}$, and to decode this enhancement information $I_{am}$ by means of the part B of artificial neural network. After this decoding, enhancement values $V_{am}$ are obtained.

The reconstruction unit 17 receives the at least one oversampled component ($Y_{surech}$, $U_{surech}$, $V_{surech}$) and the enhancement values $V_{am}$ in order to obtain a reconstructed image $I_{recstr}$ (which will then be close to the initial image I).

The set formed by the part A of artificial neural network of the electronic encoding device 2 and the part B of artificial neural network of the electronic decoding device 12 (the output of the part A of artificial neural network being applied to the input of the part B of artificial neural network) thus forms an autoencoder.

In this case, an architecture such as that described in the article "*Joint Autoregressive and Hierarchical Priors for Learned Image Compression*", by Minnen et al. in NIPS'18: Proceedings of the 32nd International Conference on Neural Information Processing Systems, December 2018 p. 10794-10803, may be used.

Previously to the use of the electronic encoding device 2 for implementing the encoding method according to the invention that will be described hereinafter, and to the use of the electronic decoding device 12 for implementing the decoding method according to the invention that will be described hereinafter, a phase of learning the set C formed by a portion G of artificial neural network and an additional part H of artificial neural network is implemented.

Figure 3:
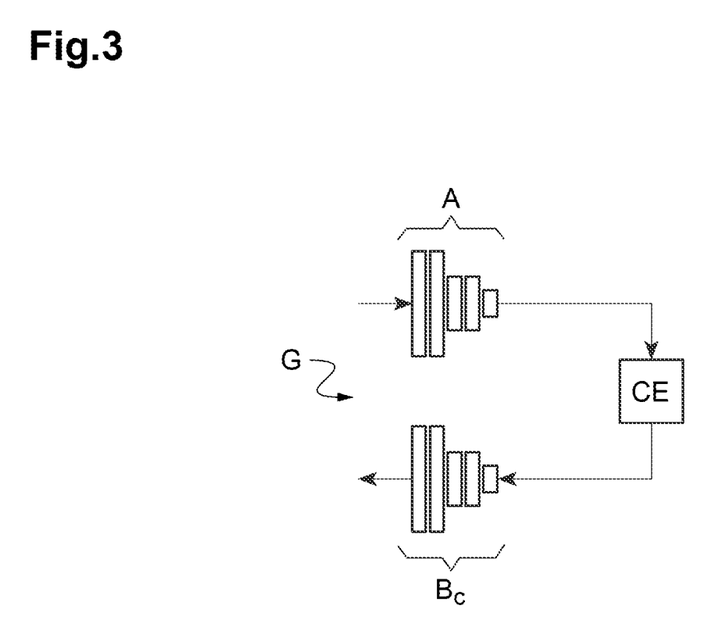
FIG. 3 schematically shows a portion of artificial neural network used by the electronic encoding device of FIG. 1.

The portion G of artificial neural network is formed by the union of the part A of artificial neural network, a complementary part Bc of artificial neural network, and an entropic encoding module CE interposed between the part A of artificial neural network and the complementary part Bc of artificial neural network. This portion G of artificial neural network is illustrated in FIG. 3.

The complementary part Bc of artificial neural network has an identical structure to the part B of artificial neural network of the electronic decoding device 12 according to the invention and is configured to decode a signal encoded by the part A of artificial neural network and the entropic encoding module CE described hereinafter.

The entropic encoding module CE is intended to apply a compression by entropic encoding to the result of the signal compression carried out by the part A of the artificial neural network in order to improve the result of this compression. Here, the entropic model used is a K-Gaussian mixture model, and defined by a probability $$p_{\hat{y}}(\hat{y}) \sim \Sigma_{k=1}^{K} \omega^{(k)} N(\mu^{(k)}, \sigma^{2(k)})$$ [Math 1]

with $\mu^{(k)}$ the expected value of the k-th Gaussian and $\sigma^{2(k)}$ the variance of the k-th Gaussian.

The additional part H of artificial neural network is intended to determine the parameters of the entropic model which are formed by the coefficients $\omega^{(k)}$, $\mu^{(k)}$ et $\sigma^{2(k)}$ of the entropic model.

The phase of learning set C thus aims to determine the optimum weights of the portion G of artificial neural network and the additional part H of artificial neural network. Therefore, by determination of the optimum weights of the additional part H of artificial neural network, the coefficients $\omega^{(k)}$, $\mu^{(k)}$ et $\sigma^{2(k)}$ of the entropy model of the entropic encoding module are determined and injected into the portion G of artificial neural network.

The phase of learning the set C consists in determining, by processing a set of training images, or of training image components by the set C, the different parameters, weights and coefficients of this set C, by implementing for example an gradient backpropagation algorithm.

It is considered here that, for a training image $I_e^{HR}$, the three components of the training image are used during the learning phase. Therefore, in the following description of the learning phase, when the term "training image $I_e^{HR}$", or "base training images $I_e^{HRB}$", or "compressed base images $I_e^{HRC}$", or "test base images $I_e^{HRt}$", or "oversampled base images $I_e^{HRs}$" is used, it must be understood all the three components of these images.

The training images $I_e^{HR}$ are high resolution images in YUV420 format.

Figure 4:
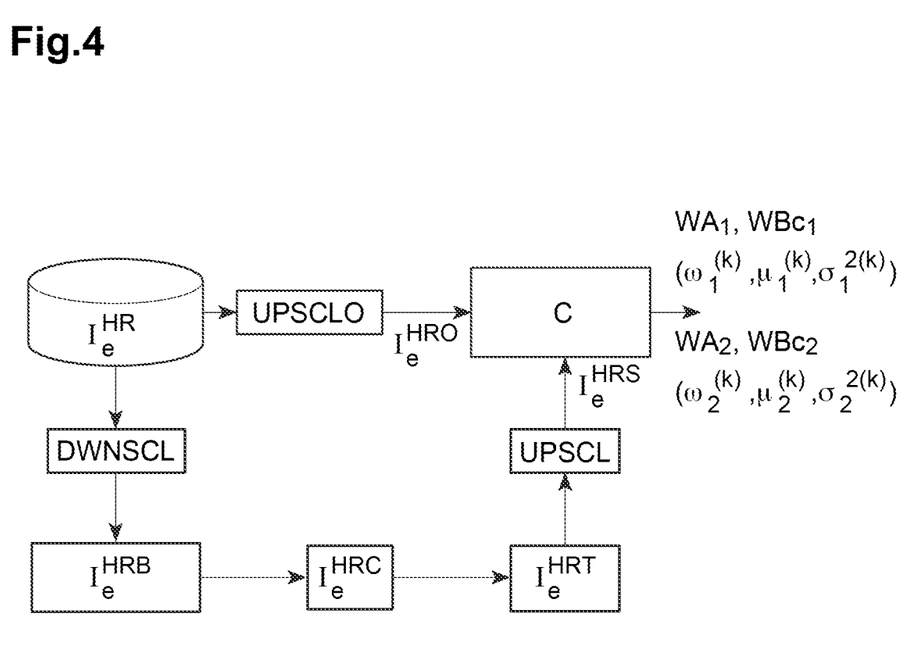
FIG. 4 is a block diagram of a phase of learning of a set, used within the framework of the invention.

A block-diagram of the learning phase is shown in FIG. 4.

The training images $I_e^{HR}$ are subsampled by a factor 2 in order to obtain base training images $I_e^{HRB}$. Then, the base training images are compressed using the VTM software (more precisely, the VVC test model), compatible with the Versatile Video Coding (VVC) standard, and using different values of quantification parameters, in order to generate compressed base images $I_e^{HRC}$. Finally, the compressed base images $I_e^{HRC}$ are decoded in order to obtain test base images $I_e^{HRT}$.

The test base images $I_e^{HRT}$ are then converted from YUV420 format to YUV444 format by duplication of their chrominance components.

After this conversion, the test base images $I_e^{HRT}$ are oversampled using an oversampling algorithm, for example of the traditional type or based on a convolutional neural network, to obtain oversampled base images $I_e^{HRs}$. Reference will be made to the articles "*Lanczos filtering in one and two dimensions*" by Duchon, C. E. in Journal of Applied Meteorology and Climatology, 18(8) (1979), 1016-1022, and "*Enhanced deep residual networks for single image*

*super-resolution*", by Lim, B. et al. in Proceedings of the IEEE conference on computer vision and pattern recognition workshops (2017) pp. 136-144, fora description of such algorithms.

Moreover, the training images $I_e^{HR}$ are also converted from YUV420 format to YUV444 format by duplication of their chrominance components, to generate original training images $I_e^{HRo}$.

The set C is then trained as follows, according to two possible variants.

The part A of artificial neural network receives as an input a couple of images CI ($I_e^{HRo}$, $I_e^{HRs}$) consisted of an original training image $I_e^{HRo}$ and of the corresponding oversampled base image $I_e^{HRs}$.

Two possible variants will now be described, a conditional encoding variant and a residual encoding variant, which will be explained hereinafter.

In the conditional encoding variant, the part A of artificial neural network receives as an input each of the three component of the original training image $I_e^{HRo}$ and of the corresponding oversampled base image $I_e^{HRs}$, that is to say 6 signals in total. They are, for example, the luminance component $Y_e^{HRo}$, the first chrominance component $U_e^{HRo}$, and the second chrominance component $V_e^{HRo}$ on the one hand, and on the other hand the luminance component $Y_e^{HRs}$, the first chrominance component $U_e^{HRs}$ and the second chrominance component $V_e^{HRs}$.

In the residual encoding variant, the pixel-to-pixel differences $\Delta_e^{YHR}$, between the luminance component $Y_e^{HRo}$ and the luminance component $Y_e^{HRs}$, $\Delta U_e^{HR}$, between the first chrominance component $U_e^{HRo}$ and the first chrominance component $U_e^{HRs}$, and $\Delta V_e^{HR}$ between the second chrominance component $V_e^{HRo}$ and the second chrominance component $V_e^{HRs}$ are calculated. The part A of artificial neural network receives as an input the three signals $\Delta Y_e^{HR}$, $\Delta U_e^{HR}$ and $\Delta V_e^{HR}$. Each component being a matrix of pixels, it is meant by pixel-to-pixel difference between two components the matrix consisted of pixels, whose value is equal to the difference of value of the corresponding pixels in each of the two components.

In either one of the conditional encoding variant and the residual encoding variant, a gradient backpropagation algorithm is then implemented in order to minimize, for each couple of images CI ($I_e^{HRo}$, $I_e^{HRs}$) the cost function:

$$L = R + \lambda D(I_e^{HRo}, \hat{I}_e^{HR}) \quad \text{[Math 2]}$$

where

D represents the distortion between the current original training image $I_e^{HRo}$ and a predicted image $\hat{I}_e^{HR}$ calculated as a function of the current original training image $I^{HR}$ and the oversampled base image $I_e^{HRs}$. The distortion D corresponds for example to the mean squared error between the pixel values of the current original training image $I_e^{HRo}$ and the pixel values of the image $\hat{I}_e^{HR}$.

R represents the entropy of the latent compressed vector, that is to say, after compression by the part A of artificial neural network, R being defined by:

$$R = -\log_2 p_{\tilde{y}}(\hat{y}) \quad \text{[Math 3]}$$

where $p_{\tilde{y}}(\hat{y})$ represents the probability of the latent compressed vector in relation with the chosen entropy model. For example, as already mentioned hereinabove the entropy model chosen may be a K-Gaussian mixture model, and in this case $$p_{\tilde{y}}(\hat{y}) \sim \Sigma_{k=1}^{K} \omega^{(k)} N(\mu^{(k)}, \sigma^{2(k)}) \quad \text{[Math 4]}$$

with $\mu^{(k)}$ the expected value of the k-th Gaussian and $\sigma^{2(k)}$ the variance of the k-th Gaussian. Any other entropy model may be used, such as a Gaussian distribution model or a Laplacian distribution model.

λ A represents a Lagrange multiplier used to adjust a compromise between the data rate and the distortion of the image.

A so-called "mini-batch gradient descent" technique as that described in the article "*Large-scale machine learning with stochastic gradient descent*", by L. Bottou, in *Proceedings of COMPSTAT'2010*, Springer 2010, pp. 177-186, may for example be used.

During this learning phase, all the couples CI ($I_e^{HRo}$, $I_e^{HRs}$) are processed.

At each processing of a couple of images CI ($I_e^{HRo}$, $I_e^{HRs}$) during the learning phase, noise is added to the latent vector resulting from the compression of the part A of artificial neural network in order to emulate the quantification process and to facilitate the implementation of the gradient backpropagation algorithm.

At the end of the learning phase, the following parameters are obtained:
- the weights WA1 of the part A of artificial neural network in the case of the conditional encoding variant,
- the weights WBc1 of the complementary part Bc of artificial neural network in the case of the conditional encoding variant,
- the coefficients of the entropic model ($\omega_1^{(k)}$, $\mu_1^{(k)}$, $\sigma_1^{2(k)}$) in the case of the conditional encoding variant,
- the weights WA2 of the part A of artificial neural network in the case of the residual encoding variant,
- the weights WBc2 of the complementary part Bc of artificial neural network in the case of the residual encoding variant,
- the coefficients of the entropic model ($\omega_2^{(k)}$, $\mu_2^{(k)}$, $\sigma_2^{2(k)}$) in the case of the residual encoding variant.

An example of method for encoding an image I based on at least one component C of the image I, implemented by the electronic encoding device 2, will now be described with reference to FIG. 5.

Figure 5:
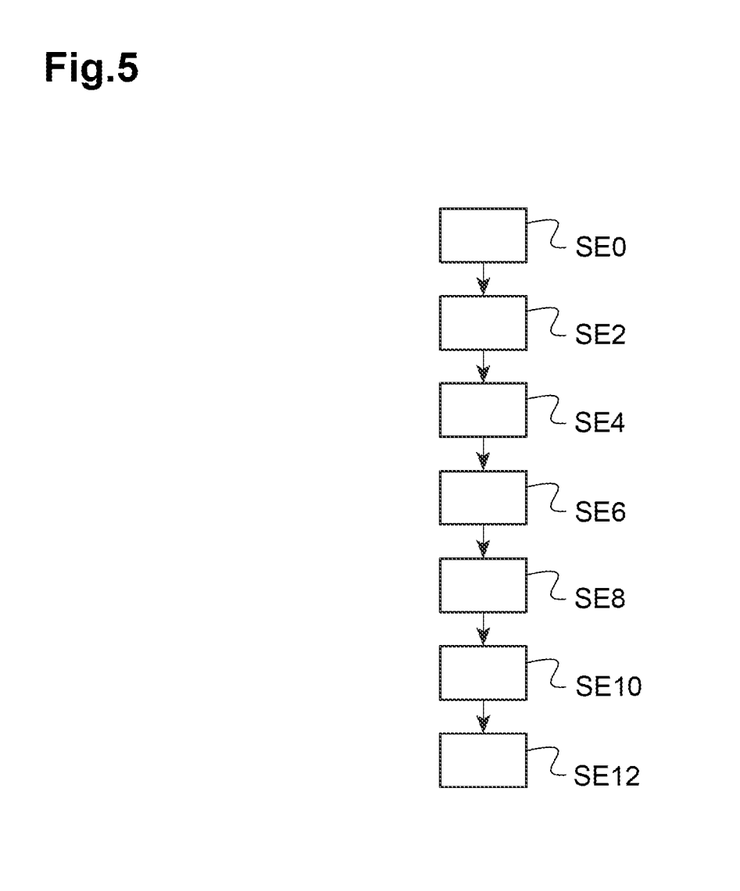
FIG. 5 is a flowchart showing steps of an encoding method implemented within the electronic encoding device of FIG. 1.

The storage unit 3 linked to the processor 4 stores for example computer program instructions designed to implement a part at least of the steps of the method of FIG. 5 when these instructions are executed by the processor 4. In other words, the processor 4 is programmed to implement a part at least of the steps of FIG. 5.

The case considered here is the case in which the at least one component of the current image I is consisted of three components, and more particularly in the case where these components correspond to three color components of the image I, i.e. the luminance component Y, as well as the first chrominance component U and the second chrominance component V of image I. Any other colorimetric space may be used within the framework of the invention.

During a step SE0, the processor 4 receives the luminance component Y, the first chrominance component U and the second chrominance component V constituting content data Binit, as well as the above-described format data P.

Then, the processor 4 implements a step SE2 during which the unit 8 for obtaining at least one base component from the processor receives the luminance component Y of the image, the first chrominance component U, the second chrominance component V, and the information relating to a subsampling factor included in format data P.

Then the processor implements a step SE4 during which the subsampling module 81 subsamples the luminance component Y, the first chrominance component U and the second chrominance component V of the image I, in order to generate respectively an intermediate luminance component $Y_{int}$, a first intermediate chrominance component $U_{int}$ and a second intermediate chrominance component $V_{int}$. For that purpose, the subsampling module uses the information relating to a subsampling factor.

For example, the luminance component Y, the first chrominance component U and the second chrominance component V of the image I have an 8K resolution and the intermediate luminance component $Y_{int}$, the first intermediate chrominance component $U_{int}$ and the second intermediate chrominance component $V_{int}$ have a 4K resolution.

In another example, the luminance component Y, the first chrominance component U and the second chrominance component V of the image I have an 4K resolution and the intermediate luminance component $Y_{int}$, the first intermediate chrominance component $U_{int}$ and the second intermediate chrominance component $V_{int}$ have a HD resolution.

In still another example, the luminance component Y, the first chrominance component U and the second chrominance component V of the image I are of YUV444 format and the intermediate luminance component $Y_{int}$, the first intermediate chrominance component $U_{int}$ and the second intermediate chrominance component $V_{int}$ are of YUV420 format.

Then, the processor 4 implements a step SE6 during which the encoding module 82 compresses the intermediate luminance component $Y_{int}$, the first intermediate chrominance component $U_{int}$ and the second chrominance component $V_{int}$, in order to obtain a base layer $C_{base}$. For example, the encoding module can use the WC (Versatile Video Coding) code. Any other simple-layer encoding method can be used.

Then, the processor implements a step SE8 during which the decoding module 83 decodes the base layer $C_{base}$, in order to obtain respectively a base luminance component $Y_{decbase}$, a first base chrominance component $U_{decbase}$ and a second base chrominance component $V_{decbase}$.

Then, the processor implements a step SE10 during which the oversampling unit 10, using the information relating to the subsampling factor, oversamples the base component $Y_{decbase}$, the first base chrominance component $U_{decbase}$ and the second base chrominance component $V_{decbase}$ in order to generate respectively an oversampled luminance component $Y_{surech}$, a first oversampled chrominance component $U_{surech}$ and a second oversampled chrominance component $V_{surech}$. The oversampling operation carried out by the oversampling unit 10 is for example the inverse of the subsampling operation carried out by the subsampling module 81.

For example, the resolution of the base luminance component $Y_{decbase}$, the first base chrominance component $U_{decbase}$ and the second base chrominance component $V_{decbase}$ of the image to be compressed may be a 4K resolution and the resolution of the oversampled luminance component $Y_{surech}$, the first oversampled chrominance component $U_{surech}$ and the second oversampled chrominance component $V_{surech}$ may be an 8K resolution.

In another example, the resolution of the base luminance component $Y_{decbase}$, the first base chrominance component $U_{decbase}$ and the second base chrominance component $V_{decbase}$ of the image to be compressed may be a HD resolution and the resolution of the oversampled luminance component $Y_{surech}$, the first oversampled chrominance component $U_{surech}$ and the second oversampled chrominance component $V_{surech}$ may be a 4K resolution.

In still another example, the format of the base luminance component $Y_{decbase}$, the first base chrominance component $U_{decbase}$ and the second base chrominance component $V_{decbase}$ of the image to be compressed may be the YUV420 format and the format of the oversampled luminance component $Y_{surech}$, the first oversampled chrominance component $U_{surech}$ and the second oversampled chrominance component $V_{surech}$ may be the YUV444 format. Typically, a duplication of the chrominance components is made to perform the oversampling.

The oversampled luminance component $Y_{surech}$, the first oversampled chrominance component $U_{surech}$ and the second oversampled chrominance component $V_{surech}$ constitute oversampled content data Bsurech that will be processed by the processor.

Then, the processor implements a step SE12 during which the encoding unit 6 will produce compressed data based on initial content data Binit and oversampled content data Bsurech, as described hereinafter.

Figure 6:
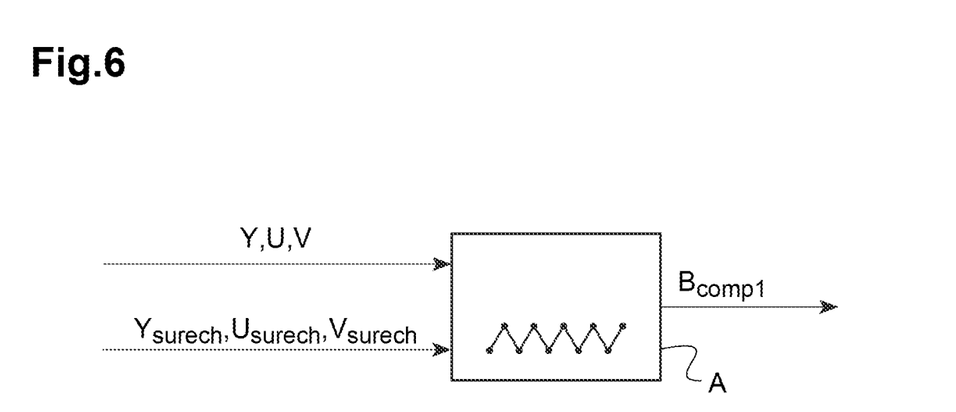
FIG. 6 schematically shows a first alternative of the encoding method implemented within the electronic encoding device of FIG. 1.

In the conditional encoding variant, using the part A of neuronal network of the set C trained according to this variant, and as illustrated in FIG. 6, this part A of artificial neural network receives as an input the luminance component Y, the first chrominance component U and the second chrominance component V of the image I, the oversampled luminance component $Y_{surech}$, the first oversampled chrominance component $U_{surech}$ and the second oversampled chrominance component $V_{surech}$. The part A of artificial neural network compresses these input data into data $B_{comp1}$. Then the entropic encoding module CE, using the entropic model parameters determined during the learning phase, compresses data $B_{comp1}$ to produce as an output compressed data C1 comprising enhancement information $I_{am1}$.

Figure 7:
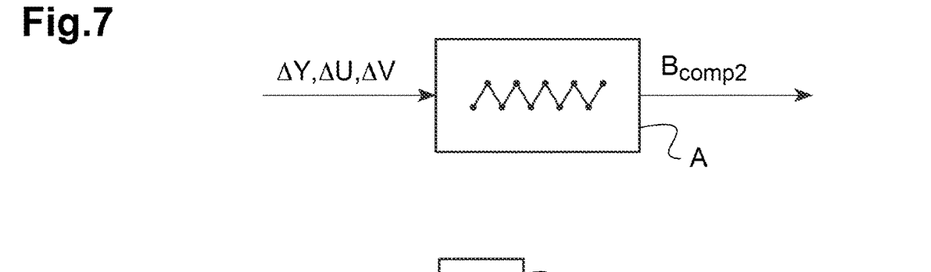
FIG. 7 schematically shows a second alternative of the encoding method implemented within the electronic encoding device of FIG. 1.

In the conditional encoding variant, using the part A of neuronal network of the set C trained according to this variant, and as illustrated in FIG. 7, this part A of neural network receives as an input the pixel-by-pixel difference ΔY between the luminance component Y and the oversampled luminance component $Y_{surech}$, the pixel-by-pixel difference ΔY between the first chrominance component U and the first oversampled chrominance component $U_{surech}$, and the pixel-by-pixel difference ΔV between the second chrominance component V and the second oversampled chrominance component $V_{surech}$. The part A of artificial neural network compresses these input data into data $B_{comp2}$. Then the entropic encoding module CE, using the entropic model parameters determined during the learning phase, compresses data $B_{comp2}$ to produce as an output compressed data C2 comprising enhancement information $I_{am2}$.

In either one of the conditional encoding variant and the residual encoding variant, the encoding method according to the invention prepares data $D_{enc}$ intended to an electronic decoding device 12 according to the invention, as described hereinabove, comprising:

a base layer $C_{base}$, enhancement information $I_{am1}$ in the case of the conditional encoding variant, as the case may be, the weights WBc1 of the other part Bc of artificial neural network in the case of the conditional encoding variant, the coefficients of the entropic model $(\omega_1^{(k)}, \mu_1^{(k)}, \sigma_1^{2(k)})$ in the case of the conditional encoding variant, enhancement information $I_{am2}$ in the case of the residual encoding variant, as the case may be, the weights WBc2 of the other part Bc of artificial neural network in the case of the residual encoding variant, the coefficients of the entropic model $(\omega_2^{(k)}, \mu_2^{(k)}, \sigma_2^{2(k)})$ in the case of the residual encoding variant, the above-described format data P, possibly reformatted so that they can be read by the electronic decoding device according to the invention.

In practice, the weights WBc1 or WBc2 are not always transmitted in the data $D_{enc}$. For example, the above-described learning phase may be a universal learning phase in which the weights WBc1 or WBc2 are learnt then frozen. In this case, the weights WBc1 or WBc2 are stored in the non-volatile memory of an electronic decoding device 12 according to the invention. In another example in which the weights WBc1 or WBc2 are specific to the content, if a stream representing a sequence of images is received by the electronic decoding device 12 according to the invention, the weights WBc1 or WBc2 can be received only with the data $D_{enc}$ corresponding to the first image of the sequence of images.

Figure 8:
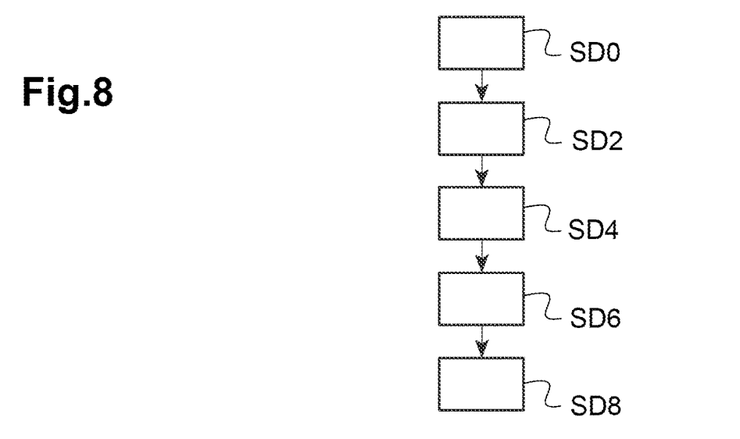
FIG. 8 is a flowchart showing steps of a first alternative of a decoding method implemented within the electronic decoding device of FIG. 2.

An example of method for decoding an image I based on a base layer and enhancement information, implemented by the electronic decoding device, will now be described with reference to FIG. 8.

The storage unit 18 linked to the processor 16 stores for example computer program instructions designed to implement a part at least of the steps of the method of FIG. 6 when these instructions are executed by the processor 16. In other words, the processor 16 is programmed to implement a part at least of the steps of FIG. 6. As mentioned hereinabove, as an alternative to the use of the processor 16, the decoding method may be implemented by any type of integrated circuit, for example of the ASIC or FPGA type.

The base layer $C_{base}$ corresponds to the result of the subsampling and encoding operations respectively carried out by the subsampling module 81 and the encoding module 82 of the electronic encoding device 2 according to the invention, on the three color components of the image to be decoded, for example the luminance component Y of the image I, as well as the first chrominance component U and the second chrominance component V of the image I. Any other color representation system could be used, such as the RGB coding system.

Let's consider the case of the conditional encoding variant.

The method starts by a step SD0, during which the reception unit 14 receives a base layer $C_{base}$ constituting content data Binit, as well as above-described format data P. Format data P comprise in particular the information relating to the oversampling factor that has been applied to the images received to be decoded. The reception unit 14 transmits them to the processor 16.

The reception unit 14 then also receives enhancement information $I_{am1}$, the weights WBc1 of the other part Bc of artificial neural network and the coefficients of the entropic model ($\omega_1^{(k)}$, $\mu_1^{(k)}$, $\sigma_1^{2(k)}$), which it transmits to the processor 16.

Then, the processor implements a step SD2, during which the first decoding unit 11 receives from the processor 16 the base layer $C_{base}$. The first decoding unit 11 decodes the base layer $C_{base}$, into a base luminance component $Y_{decbase}$, a first base chrominance component $U_{decbase}$ and a second base chrominance component $V_{decbase}$. For example, if the base layer $C_{base}$ has been encoded with the WC module, any decoding module compatible with this standard may be used by the first decoding unit 11.

Then, the processor 16 implements a step SD4, during which the oversampling unit 13 receives respectively from the first decoding unit 11 the base luminance component $Y_{decbase}$, the base chrominance component $U_{decbase}$, and the second base chrominance component $V_{decbase}$, and from the processor 16 the information relating to the oversampling factor included in data P. The oversampling unit 13 oversamples the base luminance component $Y_{decbase}$, the first base chrominance component $U_{decbase}$ and the second base chrominance component $V_{decbase}$ using the oversampling facture, in order to obtain an oversampled luminance component $Y_{surech}$, a first oversampled chrominance component $U_{surech}$ and a second oversampled chrominance component $V_{surech}$.

For example, if data P indicate that the initial images, i.e. before encoding, had an 8K resolution, the oversampling unit 13 oversamples so that the oversampled luminance component $Y_{surech}$, the first oversampled chrominance component $U_{surech}$, and the second oversampled chrominance component $V_{surech}$ have an 8K resolution.

In another example, if data P indicate that the initial images, i.e. before encoding, had a 4K resolution, the oversampling unit 13 oversamples so that the oversampled luminance component $Y_{surech}$, the first oversampled chrominance component $U_{surech}$, and the second oversampled chrominance component $V_{surech}$ have an 4K resolution.

In still another example, if data P indicate that the initial images, i.e. before encoding, were in YUV444 format, the oversampling unit 13 oversamples to this format.

Then, the processor 16 implements a step SD6, during which the second decoding unit 15 receives from the processor 16, the enhancement information $I_{am1}$, as well as, as the case may be, the weight WBc1 of the complementary part Bc of artificial neural network and the coefficients of the entropic model ($\omega_1^{(k)}$, $\mu_1^{(k)}$, $\sigma_1^{2(k)}$). Indeed, the weights WBc1 may have already been received by the electronic decoding device 12 during the sending of data $D_{enc}$ relating to another image to be decoded. Then, the second decoding unit 15 uses the coefficients of the entropic model ($\omega_1^{(k)}$, $\mu_1^{(k)}$, $\sigma_1^{2(k)}$) and injects into the part B of artificial neural network the weights WBc1 of the part Bc of artificial neural network in order to decode the enhancement information $I_{am1}$. More precisely, the second decoding unit 15 applies the enhancement information $I_{am1}$ at the input of the part B of artificial neural network. After decoding, enhancement values $V_{am1}$ are obtained. The enhancement values $V_{am1}$ comprise three enhancement components $Y_{compam1}$, $U_{compam1}$ and $V_{compam1}$.

Then the processor 16 implements a step SD8, during which the reconstruction unit 17 receives, on the one hand from the oversampling unit 13, the oversampled luminance component $Y_{surech}$, the first oversampled chrominance component $U_{surech}$, and the second oversampled chrominance component $V_{surech}$, and on the other hand, from the second decoding unit 15, the three enhancement components $Y_{compam1}$, $U_{compam1}$ and $V_{compam1}$.

Figure 9:
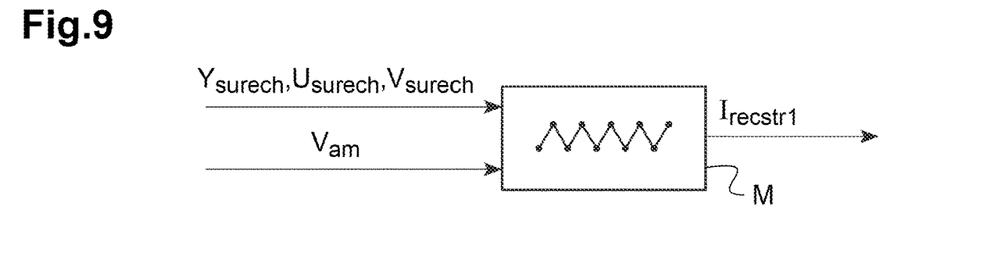
FIG. 9 schematically shows a first alternative of the decoding method implemented within the electronic decoding device of FIG. 2.

The reconstruction unit 17 then uses, as illustrated in FIG. 9, another part M of artificial neural network configured to reconstruct the image to be decoded. The other part M of artificial neural network receives as an input, on the one hand, the oversampled luminance component $Y_{surech}$, the first oversampled chrominance component $U_{surech}$, and the second oversampled chrominance component $V_{surech}$, and on the other hand, the three enhancement components $Y_{compam1}$, $U_{compam1}$ and $V_{compam1}$. The other part M of artificial neural network thus produces at its output a reconstructed decoded image $I_{recstr1}$ whose quality is improved with respect to the oversampled image composed of the components $Y_{surech}$, $U_{surech}$ and $V_{surech}$, thanks to the use of the three enhancement components $Y_{compam1}$, $U_{compam1}$ and $V_{compam1}$.

The sequence of steps SD0, SD2, SD4, SD6 and SD8 corresponds to an example of decoding method the case of the conditional encoding variant.

Let's consider now the case of the residual encoding variant. The decoding method according to the invention will now be described, with reference to FIG. 10, by a sequence of steps SD0b, SD2b, SD4b, SD6b and SD8b, where steps SD2b and SD4b are respectively identical to steps SD2 and SD4.

Figure 10:
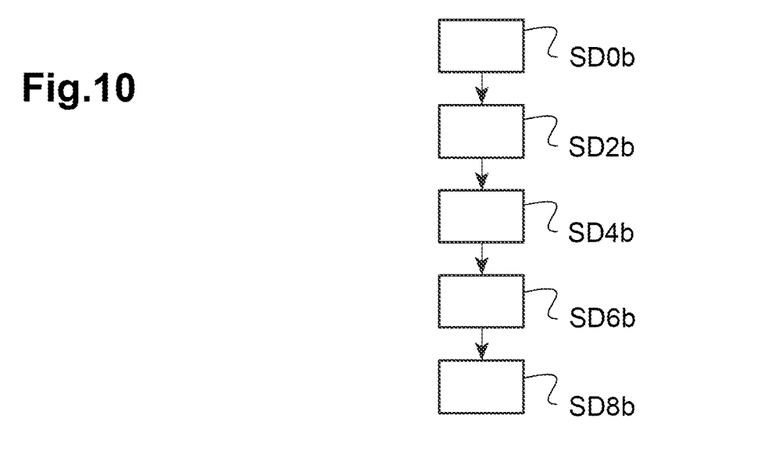
FIG. 10 is a flowchart showing steps of a second alternative of the decoding method implemented within the electronic decoding device of FIG. 2.

In this variant, the method starts at a step SD0b, during which the reception unit 14 receives a base layer $C_{base}$ constituting content data Binit, as well as above-described format data P. Format data P comprise in particular the information relating to the subsampling factor that has been applied to the images received to be decoded. The reception unit 14 transmits them to the processor 16.

The reception unit 14 then also receives enhancement information $I_{am2}$, and, as the case may be, the weights WBc2 of the complementary part Bc of artificial neural network and the coefficients of the entropic model $(\omega_2^{(k)}, \mu_2^{(k)}, \sigma_2^{2(k)})$, which it transmits to the processor. Indeed, as for the conditional encoding variant, the weights WBc2 may have already been received by the electronic decoding device 12 during the sending of data $D_{enc}$ relating to another image to be decoded.

Then the processor 16 implements a step SD2b identical to the above-described step SD2, in which are obtained a base luminance component $Y_{decbase}$, a first base chrominance component $U_{decbase}$, and a second base chrominance component $V_{decbase}$ by decoding of the base layer $C_{base}$.

Then the processor 16 implements a step SD4b identical to above-described step SD4, in which are obtained an oversampled luminance component, a first oversampled chrominance component $U_{surech}$, and a second oversampled chrominance component $V_{surech}$.

Then, the processor implements a step SD6b, during which the second decoding unit 15 receives from the processor 16 the enhancement information $I_{am2}$, as well as the weight WBc2 of the complementary part Bc of artificial neural network and the coefficients of the entropic model $(\omega_2^{(k)}, \mu_2^{(k)}, \sigma_2^{2(k)})$. Then, the second decoding unit 15 uses the coefficients of the entropic model $(\omega_2^{(k)}, \mu_2^{(k)}, \sigma_2^{2(k)})$ and injects into the part B of artificial neural network the weights WBc2 of the other part Bc of artificial neural network in order to decode the enhancement information $I_{am2}$. More precisely, the second decoding unit applies the enhancement information $I_{am2}$ at the input of the part B of artificial neural network. After decoding, enhancement values $V_{am2}$ are obtained. The enhancement values $V_{am2}$ consist of three enhancement components $Y_{compam2}$, $U_{compam2}$ and $V_{compam2}$.

Then the processor implements a step SD8b, during which the reconstruction unit 17 receives, on the one hand from the oversampling unit 13, the oversampled luminance component $Y_{surech}$, the first oversampled chrominance component $U_{surech}$, and the second oversampled chrominance component $V_{surech}$, and on the other hand, from the second decoding unit 15, the three enhancement components $Y_{compam2}$, $U_{compam2}$ and $V_{compam2}$.

The reconstruction unit 17 then calculates the pixel-to-pixel sum of the oversampled luminance component $Y_{surech}$ and the enhancement component $Y_{compam2}$, the pixel-to-pixel addition of the first oversampled chrominance component $U_{surech}$ and the enhancement component $U_{compam2}$, and the pixel-to-pixel addition of the second oversampled chrominance component $V_{surech}$ and the enhancement component $V_{compam2}$.

Each component being a matrix of pixels, it is meant by pixel-to-pixel sum between two components the matrix consisted of pixels, whose value is equal to the sum of the values of the corresponding pixels in each of the two components. This sum may be a weighted sum of the values of the corresponding pixels in each of the two components. Here, it is a pixel-to-pixel addition, that is to say an addition of the values of the corresponding pixels in each of the two components.

The reconstruction unit thus reconstructs a reconstructed decoded image $I_{recstr2}$ whose quality is improved with respect to the oversampled images composed of the components $Y_{surech}$, $U_{surech}$ and $V_{surech}$, thanks to the use of the three enhancement components $Y_{compam2}$, $U_{compam2}$ and $V_{compam2}$.

The above examples of encoding method and decoding method have been described in the case where the three components of the image to be encoded and to be decoded were the color luminance Y and chrominance U and V components. The encoding method and decoding method according to the invention may be applied in any other color representation systems, such as the RGB space.

Figure 11:
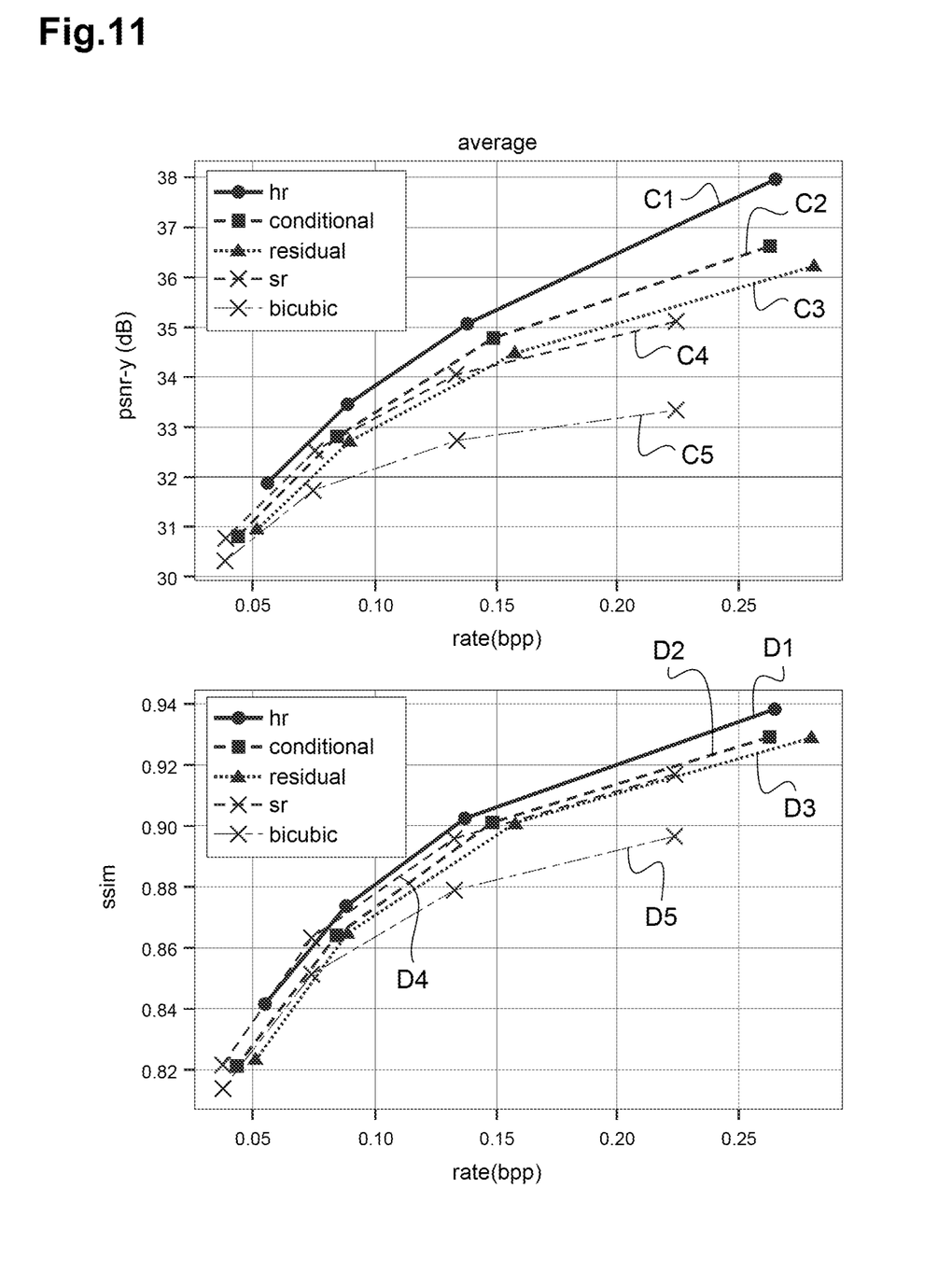
FIG. 11 shows a comparison of encoding performance obtained according to several techniques including two techniques obtained by the encoding and decoding methods according to the invention.

FIG. 11 shows a comparison of the encoding performances according to the PSNR ("Peak Signal to Noise Ratio") and SSIM ("Structural SIMilarity") metrics obtained according to several encoding techniques on the basis of the CLIC ("Challenge on Learned Image Compression") image bank.

Curves C1 and D1 represent the values of these metrics obtained with a conventional encoding technique without any step of spatial resolution adaptation. Curves C2 and D2 represent the values of these metrics obtained with the conditional encoding technique according to the invention. Curves C3 and D3 represent the values of these metrics obtained with the residual encoding technique according to the invention. Curves C4 and D4 represent the values of these metrics obtained with the association of a super-resolution technique and a step of spatial resolution adaptation. Curves C5 and D5 represent the values of these metrics obtained with the association of a bicubic interpolation technique and a step of spatial resolution adaptation.

It may be observed that the conditional encoding technique according to the invention provides better results than the association of a super-resolution technique and a step of spatial resolution adaptation in terms of image quality.

In an embodiment, the encoding method and decoding method according to the invention may be implemented based on a single component of an image, specifically the luminance component Y, in the case where the YUV colorimetric space is considered. This embodiment is a simplified mode exploiting the fact that the eye is more sensitive to luminance than to chrominance. Therefore, in certain cases, enhancing the luminance component Y while keeping less optimized chrominance components may create a sufficient visual effect.

In this case, during the phase of learning the set C, for a training image $I_e^{HR}$, only the luminance component Y is used during the training of the set C.

Two possible variants will now be described, a one-component conditional encoding variant and a one-component residual encoding variant.

More precisely, in the one-component conditional encoding variant, the part A of artificial neural network receives as an input the luminance component $Y_e^{HRo}$ of the original training image $I_e^{HRo}$ and the luminance component $Y_e^{HRs}$ of the corresponding oversampled base image $I_e^{HRs}$, that is to say 2 signals in total.

In the one-component residual encoding variant, the pixel-to-pixel difference $\Delta Y_e^{HR}$ between the luminance component $Y_e^{HRo}$ and the luminance component $Y_e^{HRs}$ is calculated and is the only signal received at the input of the part A of neural network.

In either one of the one-component conditional encoding variant and the one-component residual encoding variant, a gradient backpropagation algorithm is then implemented in order to minimize, for each couple of images CI ($I_e^{HRo}$, $I_e^{HRs}$) the same cost function as in the embodiment in which the three components of the training image $I_e^{HR}$ are used:

$$L = R + \lambda D(Y_e^{HRo}, \hat{Y}_e^{HR})$$

where

D represents the distortion between the luminance component $Y_e^{HRO}$ of the original training image $I_e^{HRo}$ and a predicted luminance component $\hat{Y}_e^{HR}$ calculated as a function of the luminance component $Y_e^{HRO}$ the original training image $I_e^{HRo}$ and the luminance component $Y_e^{HRs}$ of the oversampled base image $I_e^{HRs}$. The distortion D corresponds for example to the mean squared error between the pixel values of the current luminance component $Y_e^{HRO}$ and the pixel values of the predicted luminance component $\hat{Y}_e^{HR}$.

At the end of the learning phase, the following parameters are obtained:

the weights WA11 of the part A of artificial neural network in the case of the one-component conditional encoding variant, the weights WBc11 of the complementary part Bc of artificial neural network in the case of the one-component conditional encoding variant, the coefficients of the entropic model ($\omega_{11}^{(k)}$, $\mu_{11}^{(k)}$, $\sigma_{11}^{2(k)}$) in the case of the one-component conditional encoding variant, the weights WA21 of the part A of artificial neural network in the case of the one-component residual encoding variant, the weights WBc21 of the complementary part Bc of artificial neural network in the case of the one-component residual encoding variant, the coefficients of the entropic model ($\omega_{21}^{(k)}$, $\mu_{21}^{(k)}$, $\sigma_{21}^{2(k)}$) in the case of the one-component residual encoding variant.

An example of method for encoding an image I based on the luminance component Y of the current image I, implemented by the electronic encoding device 2, and in the case of the one-component conditional encoding variant, will now be described.

The method begins by the same steps SE0, SE2, SE4, SE6, SE8 and S10 as the encoding method described hereinabove for the conditional encoding variant. Reference may be made to their description given hereinabove.

Then, in a step SE121, the encoding unit will produce enhancement information from only the luminance component Y of the current image I and the oversampled luminance component $Y_{surech}$, as described hereinunder.

The part A of neural network of the set C trained according to the one-component conditional encoding variant receives as an input the luminance component Y and the oversampled luminance component $Y_{surech}$. The part A of neural network compresses these input data into data $B_{comp11}$. Then the entropic encoding module CE, using the entropic model parameters determined during the learning phase, compresses data $B_{comp11}$ to produce as an output compressed data C11 comprising enhancement information $I_{am11}$.

The method for encoding an image I based on the luminance component $Y^{HR}$ of the current image $I^{HR}$ according to the invention prepares data $D_{enc}$ intended for an electronic decoding device 12 according to the invention, as described hereinabove, comprising, in the case of the one-component conditional encoding variant:

enhancement information $I_{am11}$;

as the case may be, the weights WBc11 of the complementary part Bc of artificial neural network, the coefficients of the entropic model ($\omega_{11}^{(k)}$, $\mu_{11}^{(k)}$, $\sigma_{11}^{2(k)}$).

In practice, the weights WBc11 are not always transmitted in data $D_{enc}$. For example, as hereinabove, the learning phase, in the case of the one-component conditional encoding variant may be a universal learning phase, in which frozen weights WBc11 are obtained. The weights WBc11 are then for example stored in a non-volatile memory of the electronic decoding device 12 according to the invention. In another example in which the weights WBc11 are dependent on the content to be compressed, if a stream representing a sequence of images is received by the electronic decoding device 12 according to the invention, the weights WBc11 can be received with data $D_{enc}$ corresponding to the first image of the sequence of images.

Figure 12:
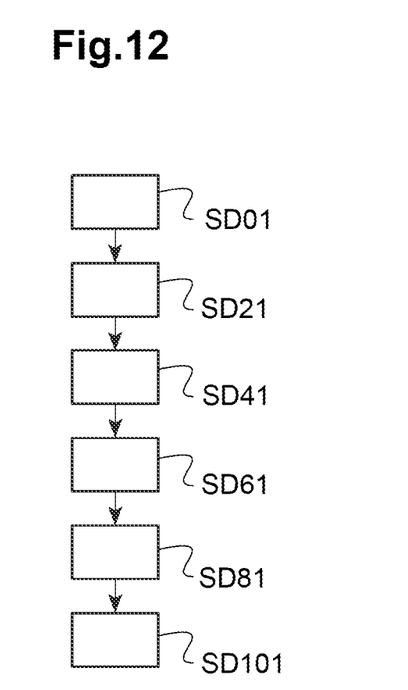
FIG. 12 is a flowchart showing steps of another alternative of the decoding method implemented within the electronic decoding device of FIG. 2.

An example of method for decoding a current image $I^{HR}$, implemented by the electronic decoding device 12, the image I having been encoded according to the above-described encoding method based on the luminance component Y of the image I, will now be described with reference to FIG. 12, in the case of the one-component conditional encoding variant.

The decoding method will now be described by a sequence of steps SD01, SD21, SD41, SD61 and SD81, where steps SD21 and SD41 are respectively identical to steps SD2 and SD4.

During a step SD01, the reception unit 14 receives a base luminance layer $Y_{base}$, a first base chrominance layer $U_{base}$ and a second base chrominance layer $V_{base}$ constituting content data Binit, as well as above-described format data P. Format data P comprise in particular the information relating to the subsampling factor that has been applied to the images received to be decoded. The reception unit 14 transmits them to the processor 16.

The reception unit 14 then also receives enhancement information $I_{am11}$, as the case may be, the weights WBc11 of the complementary part Bc of artificial neural network; the coefficients of the entropic model ($\omega_{11}^{(k)}$, $\mu_{11}^{(k)}$, $\sigma_{11}^{2(k)}$), which it transmits to the processor. Indeed, the weights WBc11 may have already been set in advance or received by the electronic decoding device 12 during the sending of data $D_{enc}$ relating to another image to be decoded.

Then the processor 16 implements a step SD21 identical to above-described step SD2, in which are obtained a base luminance component $Y_{decbase}$, a first base chrominance component $U_{decbase}$, and a second base chrominance component $V_{decbase}$ by decoding the base luminance layer $Y_{base}$, the first base chrominance layer $U_{base}$ and the second base chrominance layer $V_{base}$.

Then the processor 16 implements a step SD41 identical to above-described step SD4, in which are obtained an oversampled luminance component $Y_{surech}$, a first oversampled chrominance component $U_{surech}$, and a second oversampled chrominance component $V_{surech}$.

Then, the processor implements a step SD61, during which the second decoding unit 15 receives from the processor, the enhancement information $I_{am11}$, as well as, as the case may be, the weights WBc11 of the complementary part Bc of artificial neural network and the coefficients of the entropic model ($\omega_{11}^{(k)}$, $\mu_{11}^{(k)}$, $\sigma_{11}^{2(k)}$). Then, the second decoding unit 15 uses the coefficients of the entropic model ($\omega_{11}^{(k)}$, $\mu_{11}^{(k)}$, $\sigma_{11}^{2(k)}$) and injects into the part B of artificial neural network the weights WBc11 of the complementary part Bc of artificial neural network in order to decode the enhancement information $I_{am11}$. More precisely, the second decoding unit 15 applies the enhancement information $I_{am11}$ at the input of the part B of artificial neural network. After decoding, enhancement values $V_{am11}$ are obtained. The enhancement values $V_{am11}$ comprise an enhancement luminance component $Y_{compam11}$.

Then the processor implements a step SD81, during which the reconstruction unit 15 receives, on the one hand from the oversampling unit 13, the oversampled luminance component $Y_{surech}$, and on the other hand, from the second decoding unit 15, the enhancement luminance component $Y_{compam11}$. The reconstruction unit 15 then uses a subsequent part M1 of neural network to obtain a reconstructed luminance component $Y_{recstr1}$ by applying as an input of the subsequent part M1 of neural network, on the one hand, the oversampled luminance component $Y_{surech}$, and on the other hand, the enhancement luminance component $Y_{compam11}$. The subsequent part M1 of neural network thus produces as an output the reconstructed luminance component $Y_{recstr1}$, whose quality is improved with respect to the oversampled luminance component $Y_{surech}$, thanks to the use of the enhancement luminance component $Y_{compam11}$.

Then, the processor implements a step SD101, during which the reconstruction unit 15 receives from the oversampling unit 13 the first oversampled chrominance component $U_{surech}$, and the second oversampled chrominance component $V_{surech}$ obtained at step SD41. The reconstruction unit 15 reconstructs a reconstructed decoded image $I_{recstr11}$ by concatenation of the reconstructed luminance component $Y_{recstr1}$, the first oversampled chrominance component $U_{surech}$, and the second oversampled chrominance component $V_{surech}$. The quality of the reconstructed decoded image $Y_{recstr1}$ is improved due to the improved quality of the reconstructed luminance component $Y_{recstr1}$.

As indicated hereinabove, the invention can be applied to any image belonging to a sequence of images and hence to a video stream, in particular within the framework of an intra-frame encoding.

The invention can be applied to any subsampling factor of a step of spatial resolution adaptation on previously defined images to be encoded and decoded. The subsampling factor will be included in format data P.

Therefore, the invention makes it possible to improve the quality of the images processed by a spatial resolution adaptation technique.

The invention claimed is:

1. A method for decoding an image based on a base layer and enhancement information, said method comprising:
   decoding said base layer to obtain at least one base component;
   oversampling the at least one base component to obtain at least one oversampled component;
   decoding the enhancement information using at least one artificial neural network portion to obtain enhancement values; and
   reconstructing the image based on the at least one oversampled component and the decoded enhancement values.

2. The decoding method according to claim 1, wherein the reconstructing the image comprises applying the at least one oversampled component and the enhancement values to another artificial neural network portion.

3. The decoding method according to claim 2, further comprising obtaining parameters representative of an entropic model,
   wherein the decoding the enhancement information comprises:
      entropic decoding using the obtained parameters representative of the entropic model, and
      decoding using the at least one artificial neural network portion.

4. The decoding method according to claim 1, wherein the reconstructing the image comprises at least one pixel-to-pixel sum between the at least one oversampled component and at least one sub-set of the enhancement values.

5. The decoding method according to claim 4, further comprising obtaining parameters representative of an entropic model,
   wherein the decoding the enhancement information comprises:
      entropic decoding using the obtained parameters representative of the entropic model, and
      decoding using the at least one artificial neural network portion.

6. The decoding method according to claim 1, further comprising obtaining parameters representative of an entropic model,
   wherein the decoding the enhancement information comprises:
      entropic decoding using the obtained parameters representative of the entropic model, and
      decoding using the at least one artificial neural network portion.

7. The decoding method according to claim 6, wherein the parameters representative of the entropic model are obtained by an additional artificial neural network portion.

8. The decoding method according to claim 1, wherein the at least one artificial neural network portion forms parts of an autoencoder.

9. A method for encoding an image based on at least one component of said image, said method comprising:
   obtaining at least one base component based on the at least one component of said image by an encoding process;
   oversampling the at least one base component to obtain at least one oversampled component; and
   obtaining enhancement information by encoding by at least an artificial neural network portion and based on the at least one component of the image and the at least one oversampled component.

10. The method for encoding an image according to claim 9, wherein the obtaining the at least one base component comprises:
   subsampling the at least one component of said image to obtain at least one intermediate component,
   encoding the at least one intermediate component to obtain a base layer, and
   decoding the base layer to obtain the at least one base component.

11. The encoding method according to claim 10, wherein the artificial neural network portion receives the at least one oversampled component and the at least one component of the image.

12. The encoding method according to claim 10, further comprising, before the obtaining the enhancement information, calculating at least one pixel-to-pixel difference between the at least one component of the image and the at least one oversampled component.

13. The encoding method according to claim 9, wherein the artificial neural network portion receives the at least one oversampled component and the at least one component of the image.

14. The encoding method according to claim 9, further comprising, before the obtaining the enhancement information, calculating at least one pixel-to-pixel difference between the at least one component of the image and the at least one oversampled component.

15. A device for decoding an image based on a base layer and enhancement information, the device comprising:
   a first decoder configured to obtain at least one base component by decoding the base layer;
   an oversampling unit configured to obtain at least one oversampled component by oversampling the at least one base component;
   a second decoder configured to obtain enhancement values by decoding the enhancement information using at least one artificial neural network portion; and
   a reconstruction unit configured to reconstruct said image based on the at least one oversampled component and the obtained enhancement values.

16. The decoding device according to claim 15, wherein the reconstruction unit is configured to reconstruct said image by applying the at least one oversampled component and the enhancement values to another artificial neural network portion.

17. The decoding device according to claim 15, wherein the reconstruction unit is configured to reconstruct said image based on at least one pixel-to-pixel sum between the at least one oversampled component and at least one sub-set of the enhancement values.

18. The decoding method according to claim 15, wherein the at least one artificial neural network portion forms parts of an autoencoder.

19. A device for encoding an image based on at least one component of the image, the device comprising:
   a unit configured to obtain at least one base component based on the at least one component of the image;
   an oversampling unit configured to obtain at least one oversampled component by oversampling the at least one base component; and
   an encoder configured to obtain enhancement information by encoding using at least an artificial neural network portion, based on the at least one component of the image and the at least one oversampled component.

20. The encoding device according to claim 19, wherein the unit configured to obtain the at least one base component comprises:
   a subsampling module configured to subsample the at least one component of the image in order to obtain at least one intermediate component,
   an encoding module configured to encode the at least one intermediate component to obtain a base layer, and
   a decoding module configured to decode said base layer to obtain said at least one base component.

* * * * *